J. G. BENNING.
FLOWER POT.
APPLICATION FILED MAR. 28, 1914.
1,117,474.
Patented Nov. 17, 1914.
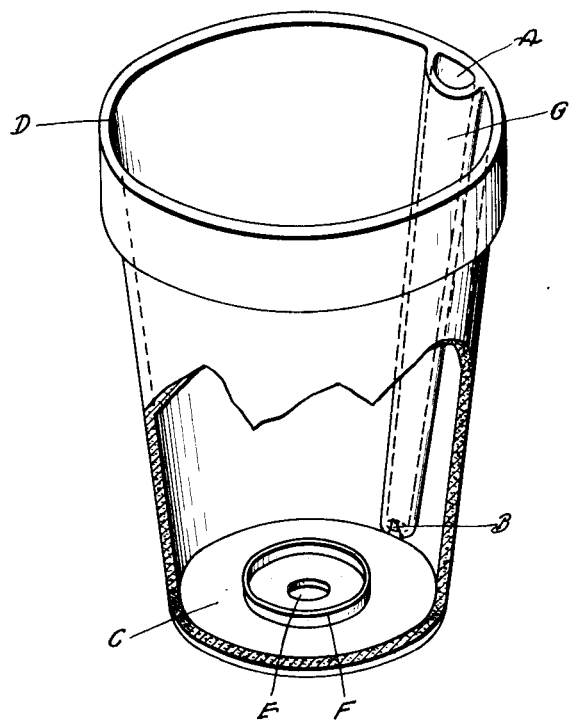
WITNESSES:
John L. Deatherage
Pearl M. Humphrey
INVENTOR
John G. Benning
BY
Chas. W. Girard
ATTORNEY

UNITED STATES PATENT OFFICE.

JOHN G. BENNING, OF KANSAS CITY, MISSOURI.

FLOWER-POT.

1,117,474.　　　Specification of Letters Patent.　　Patented Nov. 17, 1914.

Application filed March 28, 1914.　Serial No. 828,015.

*To all whom it may concern:*

Be it known that I, JOHN G. BENNING, a citizen of the United States, residing at Kansas City, in the county of Jackson and State of Missouri, have invented a new and useful Flower-Pot, of which the following is a specification.

This invention relates to flower pots, jardinières and the like, and the object in view is to provide a pot having a bottom opening and a reservoir arranged over the bottom of the pot for maintaining a supply of water or liquid for the roots of the plant which is to be contained by the pot; one of the walls of the reservoir being so arranged as to permit the excess of water or liquid supplied to the reservoir to filter out through said bottom opening. The construction is also such as to include provision whereby the supply of liquid in the reservoir may be conveniently renewed as often as necessary.

With the above general object in view, the invention will now be described with reference to the accompanying drawing illustrating a simple construction which has been devised for embodying the proposed improvements.

In said drawing, the figure shown represents a perspective view of a flower pot embodying the invention, with a portion of the side of the pot broken away to disclose the interior.

Referring to the drawing, a pot D is illustrated, being of earthenware or any suitable material, and having the bottom C, which is provided with a water outlet opening E. Intermediate this opening E and the sides of the pot is provided a partitioning wall F, preferably formed integral with the upper face of the bottom C. This partitioning wall coöperates with the sides of the pot to form a water-tight reservoir over a part of the imperforate portion of the bottom C; said reservoir being, in the form illustrated, of annular shape extending around the margin of the bottom. If desired, a layer of sand or equivalent loose material, may be placed in the reservoir.

For the purpose of conveniently maintaining a supply of liquid in the reservoir, a tube G is provided, being preferably formed integral with the side of the pot and tapered slightly toward its lower end, and having an opening A at the top of the pot and an opening B at the lower end of the tube. As illustrated, the opening B may be adjacent the bottom of the pot and within the above-described reservoir, though of course any desired number of openings B may be provided and the tube G may be of the length shown or shorter, since it is not essential that the same discharge directly into the reservoir.

It is well known that the soil in the usual form of flower-pot tends to harden or become baked, thereby obstructing the flow of water to the bottom and around the roots of the plant. With a pot of the foregoing construction, the liquid supplied to the pot is held in the reservoir, which opens upwardly so as to afford a continuous supply of liquid for the soil, with the result that the latter is kept moist and loose by the evaporation of the water from the reservoir. Any surplus water or liquid will simply drain over the partitioning wall F, and thereafter filter out through the outlet opening E, in the usual manner.

Having thus described my improvements, what I claim as my invention and desire to secure by Letters Patent, is—

1. A flower-pot having a bottom comprising a flat perforate portion and a flat imperforate portion, a vertical wall on the upper face of said bottom and extending along the line separating said perforate and imperforate portions, said wall coöperating with the sides of the pot to form a water-tight reservoir over said imperforate portion of the bottom, and a tube provided with a receiving opening and with a discharge opening overlying said reservoir.

2. A flower-pot having a bottom comprising a central flat portion having an opening therethrough and an imperforate flat portion surrounding said first portion, a vertical annular wall formed integral with the upper face of said bottom along the line separating said flat bottom portions and forming with the sides of the pot a water-tight reservoir around the margin of said bottom, and a tube formed integral with the interior face of the sides of the pot and provided with a receiving opening at the top edge of the pot and with a second opening within said reservoir.

JOHN G. BENNING.

Witnesses:
JUDITH E. BENNING,
LELIA B. BENNING.